Patented May 24, 1949

2,470,906

UNITED STATES PATENT OFFICE 2,470,906

DENTIFRICE

Ralph Taylor, New York, N. Y.

No Drawing. Application July 31, 1946,
Serial No. 687,539

3 Claims. (Cl. 167—93)

This invention relates to new and improved dentifrice preparations capable of accomplishing the cleansing of teeth, gums, tongue and other parts of the oral cavity in a more complete and efficient manner than has been possible heretofore.

Previously dentifrices have, for the most part, consisted of compositions of soap, soap-like substances, soapless detergents, oxygenizing agents, abrasives, etc., in various combinations. Such preparations and others even less efficacious have not been able to penetrate successfully and to disunite the intricate mixture of stagnant glycoproteinous matter, salivary exudate, mineral and enzymatic material, epithelial shreads and miscellaneous food debris which combine to make up the adherent mucinous coat or "film" persistently covering the surfaces of the teeth and their interstices, tongue and other parts of the mouth. Any cleansing action which the previously known products display must be attributed primarily to a combination of the incomplete scraping action of the abrasives contained therein and the scrubbing action of the toothbrush, effecting a partial removal of the film, the ingredients acting more as adjuvants.

It is the object of the invention to provide a dentifrice in the form of powder, paste or liquid which is capable of transforming the mucinous coat in the oral cavity so that it is easily removable without damaging the tooth enamel or the underlying tissue.

Other objects and advantages of the invention will be apparent as it is better understood by reference to the following specification, in which the preferred embodiments are described.

I have discovered that ascorbic acid, including l-ascorbic acid ($C_6H_8O_6$) and dehydro-ascorbic acid ($C_6H_6O_6$) and the acid analogues of ascorbic acid such as d-gluco ascorbic acid and d-galacto ascorbic acid have the unique property of transforming the physical characteristics of the mucinous coat on teeth and other surfaces of the oral cavity to an extent that facilitates the easy removal thereof by mechanical action. Upon the application of ascorbic acid and its acid analogues, preferably combined with a suitable vehicle, the cohesion and viscosity of the mucinous coat are subtly but significantly altered. Macroscopically there occurs a precipitation to a coagulation to a disintegration of the continuity of the coat, the intensity of the metamorphic change depending upon the amount and concentration of the ascorbic acid or its acid analogues which may be present. The proportions of the active medium, ascorbic acid or its acid analogues, may very over a wide range without discomfort to the oral cavity or the possibility of damage to tooth enamel or the mouth tissue. This is in direct contrast to the effect of acids generally which have no substantial effect upon stagnant saliva unless used in pH ranges which are far too acid for toleration in the oral cavity with comfort and without possible irritation or injury.

In utilizing the invention, the active medium, ascorbic acid, or its acid analogues, is combined with various ingredients affording a vehicle therefor in the form of a liquid, powder or paste. It is necessary merely that the vehicle be compatible and adapted to facilitate the application of the active medium.

Thus, to provide a liquid dentifrice, a suitable solvent may be used, for example a glycol such as ethylene or propylene glycol. Suitable flavoring material may be added to improve the palatable quality of the product, which may be used by brushing in the familiar way. Such a product, when applied to the teeth and gums, will disintegrate and remove the mucinous coat readily, leaving the surfaces clean.

Similarly, the active medium may be combined with a suitable mild abrasive in pulverulent form such as calcium diphosphate, potassium-aluminum silicate, or both. A flavor may be added. The product is a powder which is adapted to be used with a brush in the usual manner and will rapidly and completely remove the mucinous coat without damage to tooth enamel or to the mouth tissue.

The powder may be converted readily into a paste by the addition of conventional bodying agents such as gum tragacanth, a preservative for the gum tragacanth such as methyl-para hydroxy benzoate, benzoate of soda and the like, and a liquid such as ethylene or propylene glycol, with or without water. A flavor may be included as in other embodiments of the invention. The paste may be used in a manner customary with toothpastes to accomplish the purpose of the invention.

The proportion of the active medium, ascorbic acid or acid analogues thereof in the dentifrice may vary widely. About 25 parts by weight per thousand affords satisfactory results. From 5 to 100 parts by weight per thousand of the active medium, or even more, may be included, though the higher proportions are unnecessary and therefore wasteful. The vehicle used is also capable of wide variation. Many of the materials commonly used in dentifrice compositions as abrasives, fillers, etc. are suitable. Solvents, abrasives and ingredients other than those specifically mentioned may be incorporated with the ascorbic acid or acid analogues thereof to provide products embodying the advantages of the invention.

The following examples are, therefore, merely illustrative of compositions which are suitable. The proportions are in parts per thousand.

Liquid

| | |
|---|---|
| Ascorbic acid | 25.0 |
| Propylene glycol | 970.0 |
| Flavor | 5.0 |

Powder

| | |
|---|---|
| Ascorbic acid | 25.0 |
| Calcium diphosphate | 485.0 |
| Potassium-aluminum silicate | 485.0 |
| Flavor | 5.0 |

Paste

| | |
|---|---|
| Ascorbic acid | 25.0 |
| Calcium diphosphate | 250.0 |
| Potassium-aluminum silicate | 250.0 |
| Gum tragacanth | 11.0 |
| Methyl-para hydroxy benzoate | 1.0 |
| Flavor | 8.0 |
| Water | 80.0 |
| Propylene glycol | 375.0 |

With these examples, it is possible by substitution or addition to modify the products as desired to meet any particular requirements. The proportions may be changed similarly without departing from the invention or sacrificing the advantages thereof.

I claim:

1. A dentifrice comprising in combination a bodying agent and more than .5% by weight of an active medium, adapted to transform mucinous coatings in the oral cavity into easily removable form, from the class consisting of ascorbic acid and acid analogues of ascorbic acid, the bodying agent being present in amount sufficient to render the dentifrice of paste consistency.

2. A dentifrice comprising in combination a vehicle comprising solid pulverulent material having mild abrasive properties and a liquid adapted to form a paste therewith and more than .5% by weight of an active medium, adapted to transform mucinous coatings in the oral cavity into easily removable form, from the class consisting of ascorbic acid and acid analogues of ascorbic acid.

3. A dentifrice comprising in combination a vehicle comprising a solid pulverulent material having mild abrasive properties and more than .5% by weight of an active medium, adapted to transform mucinous coatings in the oral cavity into easily removable form, from the class consisting of ascorbic acid and acid analogues of ascorbic acid.

RALPH TAYLOR.

REFERENCES CITED

The following references are of record in the file of this patent:

UNITED STATES PATENTS

| Number | Name | Date |
|---|---|---|
| 1,916,403 | Atkinson | July 4, 1933 |

FOREIGN PATENTS

| Number | Country | Date |
|---|---|---|
| 396,055 | Great Britain | July 24, 1933 |
| 620,777 | Germany | Oct. 26, 1935 |

OTHER REFERENCES

De Navarre: "The Chem. and Mfg. of Cosmetics," N. Y., 1941, page 509. Copy in Division 43.

Dental Cosmos—"Some Light on the Dentifrice Question," by Schermerhorn, July 1929, page 689. Copy in Division 43.

Manufacturing Perfumer—"Cosmetics in the U. S. S. R.," July 1938, page 224.